(12) United States Patent
Lundström et al.

(10) Patent No.: US 10,954,839 B2
(45) Date of Patent: Mar. 23, 2021

(54) METHOD AND SYSTEM FOR USE WHEN CORRECTING SUPPLY OF AN ADDITIVE TO AN EXHAUST GAS STREAM

(71) Applicant: Scania CV AB, Södertälje (SE)

(72) Inventors: Mikael Lundström, Hägersten (SE); Ola Stenlåås, Södertälje (SE)

(73) Assignee: Scania CV AB, Södertälje (SE)

(*) Notice: Subject to any disclaimer, the term of this patent is extended or adjusted under 35 U.S.C. 154(b) by 238 days.

(21) Appl. No.: 16/316,302

(22) PCT Filed: Jul. 6, 2017

(86) PCT No.: PCT/SE2017/050759
§ 371 (c)(1),
(2) Date: Jan. 8, 2019

(87) PCT Pub. No.: WO2018/013042
PCT Pub. Date: Jan. 18, 2018

(65) Prior Publication Data
US 2021/0033011 A1    Feb. 4, 2021

(30) Foreign Application Priority Data
Jul. 14, 2016    (SE) .................................. 1651063-8

(51) Int. Cl.
| F01N 3/20 | (2006.01) |
| F01N 3/10 | (2006.01) |
| F01N 11/00 | (2006.01) |

(52) U.S. Cl.
CPC ............. *F01N 3/208* (2013.01); *F01N 3/103* (2013.01); *F01N 3/2006* (2013.01);
(Continued)

(58) Field of Classification Search
CPC ............ B01D 53/9409; B01D 53/9477; B01D 53/9495; B01D 2251/2067;
(Continued)

(56) References Cited

U.S. PATENT DOCUMENTS

| 7,987,661 B2 | 8/2011 | Jung |
| 9,010,087 B1 | 4/2015 | Upadhyay et al. |

(Continued)

FOREIGN PATENT DOCUMENTS

| CN | 1981915 A | 6/2007 |
| CN | 101344028 A | 1/2009 |

(Continued)

OTHER PUBLICATIONS

Scania CV AB, Chinese Application No. 201780042256.0, First Office Action, dated May 27, 2020.
(Continued)

*Primary Examiner* — Brandon D Lee
(74) *Attorney, Agent, or Firm* — Moore & Van Allen PLLC; W. Kevin Ransom

(57) ABSTRACT

The present invention relates to a method for correcting a supply of additive to an exhaust gas stream resulting from combustion in an internal combustion engine. A first aftertreatment component being arranged for oxidation of nitric oxide into nitrogen dioxide, and a reduction catalytic converter being arranged downstream said first aftertreatment component. Additive is supplied to said exhaust gas stream for reduction of nitrogen oxides in said reduction catalytic converter, the additive being supplied in proportion to an occurrence of nitrogen oxides in said exhaust gas stream, said proportion being subject to correction. The method includes: supplying unburned fuel to said exhaust gas stream upstream said first aftertreatment component to reduce oxidation of nitric oxide into nitrogen dioxide in said first
(Continued)

aftertreatment component, and correcting said supply of additive to said exhaust gas stream when supplying unburned fuel to said exhaust gas stream.

26 Claims, 5 Drawing Sheets

(52) U.S. Cl.
CPC ........ *F01N 11/002* (2013.01); *F01N 2390/02* (2013.01); *F01N 2550/05* (2013.01); *F01N 2560/026* (2013.01); *F01N 2560/06* (2013.01); *F01N 2570/14* (2013.01); *F01N 2610/03* (2013.01); *F01N 2900/1404* (2013.01); *F01N 2900/1411* (2013.01)

(58) Field of Classification Search
CPC .......... B01D 2258/012; B01D 53/9418; F01N 13/009; F01N 3/0231; F01N 3/103; F01N 3/106; F01N 3/2066; F01N 3/208; F01N 3/36; F01N 2560/026; F01N 2570/14; F01N 2610/02; F01N 2610/03; F01N 2610/146; F01N 2900/0408; F01N 2900/1402; Y02A 50/20; Y02T 10/12
See application file for complete search history.

(56) References Cited

U.S. PATENT DOCUMENTS

| | | |
|---|---|---|
| 9,132,386 B2 | 9/2015 | Udd et al. |
| 9,492,788 B2 | 11/2016 | Gaudin |
| 9,494,096 B2 | 11/2016 | Pfaffinger |
| 9,593,611 B2 | 3/2017 | Kawaguchi et al. |
| 9,593,617 B2 | 3/2017 | Veldten et al. |
| 9,624,804 B2 | 4/2017 | Matsumoto et al. |
| 9,657,629 B2 | 5/2017 | Iwatani |
| 10,052,588 B2 | 8/2018 | Tanioka |
| 2004/0040284 A1 | 3/2004 | Upadhyay et al. |
| 2005/0103000 A1 | 5/2005 | Nieuwstadt et al. |
| 2007/0160508 A1 | 7/2007 | Doumeki et al. |
| 2008/0271437 A1* | 11/2008 | Matsunaga ............ F01N 13/009 60/285 |
| 2009/0217644 A1 | 9/2009 | Jung |
| 2009/0277159 A1 | 11/2009 | Driscoll et al. |
| 2010/0043397 A1 | 2/2010 | Wang et al. |
| 2010/0218487 A1 | 9/2010 | Wang et al. |
| 2010/0326051 A1 | 12/2010 | Busch et al. |
| 2011/0146239 A1 | 6/2011 | Handler et al. |
| 2012/0233986 A1 | 9/2012 | Geveci et al. |
| 2013/0232958 A1 | 9/2013 | Ancimer et al. |
| 2013/0298655 A1 | 11/2013 | Kowalkowski et al. |
| 2013/0338900 A1 | 12/2013 | Ardanese et al. |
| 2014/0065041 A1 | 3/2014 | Szailer et al. |
| 2014/0127100 A1 | 5/2014 | Gerhart et al. |
| 2014/0223886 A1 | 8/2014 | Khaled et al. |
| 2014/0373511 A1 | 12/2014 | Osburn et al. |
| 2015/0040543 A1 | 2/2015 | Shetney et al. |
| 2015/0209730 A1 | 7/2015 | Blanckenfjell et al. |
| 2015/0247435 A1 | 9/2015 | Garimella et al. |
| 2015/0273395 A1 | 10/2015 | Catalogna et al. |
| 2016/0069243 A1 | 3/2016 | Hegemann et al. |
| 2016/0186630 A1 | 6/2016 | Osburn et al. |
| 2017/0122159 A1 | 5/2017 | Bahrami |
| 2017/0130629 A1 | 5/2017 | Nagel et al. |

FOREIGN PATENT DOCUMENTS

| | | |
|---|---|---|
| CN | 103764565 A | 4/2014 |
| CN | 104053871 A | 9/2014 |
| CN | 104220710 A | 12/2014 |
| CN | 104343512 A | 2/2015 |
| CN | 104603412 A | 5/2015 |
| CN | 104813002 A | 7/2015 |
| DE | 102007040439 A1 | 3/2009 |
| DE | 102011003084 A1 | 7/2012 |
| DE | 102012211703 A1 | 1/2014 |
| DE | 102013209487 A1 | 11/2014 |
| EP | 2918805 A1 | 9/2015 |
| EP | 2977578 A1 | 1/2016 |
| EP | 3009622 A1 | 4/2016 |
| JP | H09189214 A | 7/1997 |
| JP | 2013130120 A | 4/2016 |
| JP | 2016098682 A | 5/2016 |
| KR | 10-2015-0023931 A | 3/2015 |
| WO | 2014014399 A1 | 1/2014 |
| WO | 2015046276 A1 | 4/2015 |
| WO | 2015115978 A1 | 8/2015 |
| WO | 2016010558 A1 | 1/2016 |

OTHER PUBLICATIONS

International Preliminary Report on Patentability for International Patent Application No. PCT/SE2017/050759 dated Jan. 15, 2019.
International Search Report for International Patent Application No. PCT/SE2017/050759 dated Sep. 27, 2017.
Written Opinion of the International Searching Authority for International Patent Application No. PCT/SE2017/050759 dated Sep. 27, 2017.
Scania CV AB, Korean Application No. 10-2019-7002817, Office Action, dated Feb. 24, 2020.
Scania CV AB, European Application No. 178280665, Extended European Search Report, dated Dec. 11, 2019.
Scania CV AB, European Application No. 17828066.5, Communication pursuant to Article 94(3) EPC, Oct. 26, 2020.

* cited by examiner

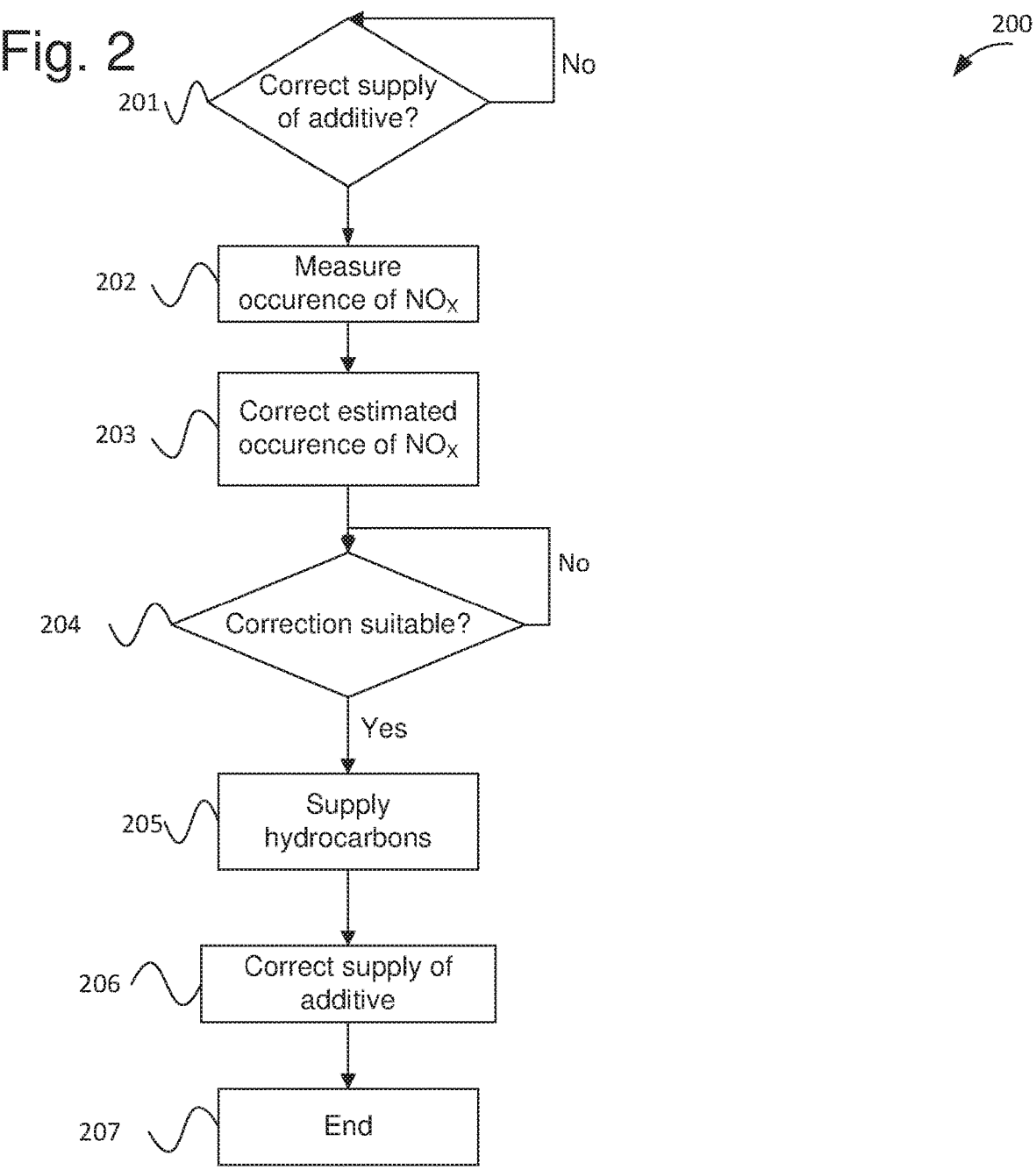

ated by a catalytic coating. For
METHOD AND SYSTEM FOR USE WHEN CORRECTING SUPPLY OF AN ADDITIVE TO AN EXHAUST GAS STREAM

CROSS-REFERENCE TO RELATE APPLICATIONS

This application is a national stage application (filed under 35 § U.S.C. 371) of PCT/SE2017/050759, filed Jul. 6, 2017 of the same title, which, in turn, claims priority to Swedish Application No. 1651063-8 filed Jul. 14, 2016; the contents of each of which are hereby incorporated by reference.

FIELD OF THE INVENTION

The present invention relates to combustion processes, and in particular to methods and systems for correcting supply of additive to an exhaust gas stream resulting from combustion. The present invention also relates to a vehicle, as well as a computer program and a computer program product that implement the method according to the invention.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

These emission standards often consist of requirements that define acceptable limits for exhaust emissions of vehicles being provided with internal combustion engines. For example, the exhaust levels of e.g. nitrogen oxides ($NO_x$), hydrocarbons (HC), carbon monoxide (CO) and particles are regulated for most kinds of vehicles in these standards.

The undesired emission of substances can be reduced by reducing fuel consumption and/or through the use of aftertreatment (purifying) of the exhaust gases that results from the combustion process.

Exhaust gases from the internal combustion engine can, for example, be treated through the use of one or more catalytic processes. There exist various kinds of catalytic converters, where different types can be used for different kinds of fuel and/or for treatment of different kinds of substances occurring in the exhaust gas stream. With regard to at least nitrogen oxides $NO_x$ (such as nitric oxide NO and nitrogen dioxide $NO_2$) heavy vehicles often comprises a method where an additive is supplied to the exhaust gas stream. The additive is supplied in order to, usually through the use of a catalytic converter, reduce the presence of nitrogen oxides $NO_x$ to less pollutive substances (mainly nitrogen and water vapour). The additive can be injected into the exhaust gas stream resulting from combustion in the internal combustion engine upstream the catalytic converter, and one common type of catalytic converter that is used in nitrogen oxide $NO_x$ reduction of this kind is Selective Catalytic Reduction (SCR) catalytic converters.

With regard to the supply of additive it is essential that the supplied amount of additive is neither too great nor too small. Consequently, it is desirable that the supplied amount of additive corresponds to an expected amount of additive.

SUMMARY OF THE INVENTION

It is an object of the present invention to provide a method and system for correcting the supply of additive to an exhaust gas stream to account for differences between an injected amount of additive and an actually required amount of additive. This object is achieved by a method according to claim 1.

According to the present invention, it is provided a method for correcting a supply of additive to an exhaust gas stream resulting from combustion in an internal combustion engine, said exhaust gas stream being subject to aftertreatment through a first and a second aftertreatment component, said first aftertreatment component being arranged for oxidation of nitric oxide into nitrogen dioxide, said second aftertreatment component being a reduction catalytic converter arranged downstream said first aftertreatment component, wherein additive is supplied to said exhaust gas stream for reduction of nitrogen oxides in said second aftertreatment component, the additive being supplied in proportion to an occurrence of nitrogen oxides in said exhaust gas stream, said proportion being subject to correction. The method includes:
  supplying unburned fuel to said exhaust gas stream upstream said first aftertreatment component to reduce oxidation of nitric oxide into nitrogen dioxide in said first aftertreatment component, and
  correcting said supply of additive to said exhaust gas stream when supplying unburned fuel to said exhaust gas stream.

The unburned fuel is preferably hydrocarbon based and the first aftertreatment component may, for example, consist of an oxidation catalytic converter, or any other kind of catalytic converter being adapted to oxidize nitric oxide into nitrogen dioxide, and where oxidation of unburned fuel (hydrocarbons) is carried out at the expense of oxidation of nitric oxides, i.e. the chemical reactions in said first aftertreatment component are such that oxidation of unburned fuel, in particular hydrocarbons, takes precedence and oxidation of nitric oxides occurs if there is surplus oxidation capacity in the first aftertreatment component. In this way the oxidation of nitric oxides can be substantially reduced or even be reduced to essentially zero.

As an alternative to using an oxidation catalytic converter in this regard the desired effect can be obtained e.g. by providing at least a portion of substantially any aftertreatment component by a suitable catalytic coating. For example, the first aftertreatment may e.g. be part of a slip catalytic converter. The second aftertreatment component may e.g. be a selective catalytic reduction (SCR) catalytic converter.

As was mentioned above, the presence of at least some substances in an exhaust gas stream resulting from combustion can be reduced through the supply of an additive to the exhaust gas stream. A reagent of the additive then reacts with one or more of the substances occurring in the exhaust gas stream to thereby form less hazardous substances.

The present invention relates to supply of additive being used to reduce the concentration of nitrogen oxides $NO_x$ in the exhaust gases resulting from combustion. With regard to such supply of additive it is important that the reagent is supplied to the exhaust gas stream in a proportion that corresponds to the presence of nitrogen oxides that is to be reduced in order to achieve the desired effect. It is also essential that the additive comprises a reagent of a kind that is capable of performing the desired reduction. If a wrong kind of reagent/additive is supplied, and/or if the supplied amount of additive is too small in relation to the presence of the substance/composition to be reduced, undesired surplus of nitrogen oxides may still remain after the reduction and be emitted into the surroundings.

Conversely, if the amount of reagent, and thereby additive being supplied to the exhaust gas stream, is high in relation to the amount of nitrogen oxides to be reduced, the supply of additive may cause a surplus of other undesired substances instead. For example, with regard to reduction of nitrogen oxides $NO_x$ using additive comprising a reagent in the form of urea, a surplus of ammonium may be emitted into the surroundings. Ammonium is classified as a hazardous substance, and emissions of ammonium are also often regulated.

The risk for undesired emissions can be reduced by a correction of the supply of additive. That is, it is determined whether the supplied amount actually corresponds to the expected, or required, amount of supplied additive, and, when found necessary, the supply is corrected. This correction may be performed at regular/predetermined points in time, and the term adaptation is often used to denote the correction.

With regard to correction in general, the correction is a function where a predetermined amount of additive to be supplied for a given situation, such as for a certain operating condition or certain estimated generation of the substance to be reduced, is corrected to account for e.g. variations in the quality of additive being used and/or tolerances/wear of components being involved in the aftertreatment. The correction includes a compensation of the predetermined amount, or quantity, to be injected.

As is known to the person skilled in the art, correction can be performed according to a number of different methods, and the invention is applicable irrespective of the particular method being used, hence such methods are not described herein. The present invention provides additional steps in any such method for performing correction.

With regard to supply of additive, this is oftentimes performed on the basis of a measured or estimated occurrence of nitrogen oxides upstream the reduction catalytic converter. Furthermore, there is, in general, feedback from a measured occurrence downstream the reduction catalytic converter through the use of a sensor measuring the occurrence of nitrogen oxides in the exhaust gas stream prior to leaving the vehicle. This feedback is a measure of the combined occurrence of nitric oxides and nitrogen dioxide in the exhaust gas stream, and in general it is assumed that a particular relation between nitric oxides and nitrogen dioxide prevail, such as e.g. that only nitric oxides remain following reduction in the reduction catalytic converter. If, however, in reality the relation differs from the assumed relation, the sensor signals may be misinterpreted.

This is due to the fact that in general the sensor sensitivity of a $NO_x$ sensor is essentially equal to 1 for nitric oxides $NO_x$ but may be as low as 0.8 for nitrogen dioxide $NO_2$. Hence, if the nitrogen oxides $NO_x$ instead consists fully or to a large extent of nitrogen dioxide $NO_2$, the feedback signal may be misinterpreted with the result that incorrect amounts of additive may be supplied. In addition, when correcting the supply of additive, sensor signals from the $NO_x$ sensor again may be misinterpreted, thereby resulting in a correction still giving rise to a wrong amount of additive being supplied to the exhaust gas stream. According to the present invention, the impact of differences in sensor sensitivity regarding measurements of nitrogen oxides, and thereby e.g. correction of the supply of additive, is reduced.

According to the invention, this is accomplished by means of a method for correcting a supply of additive to an exhaust gas stream in a system where at least a first aftertreatment component, such as an oxidation catalytic converter or other kind of aftertreatment component, in at least some modes of operation oxidizes nitric oxide NO into nitrogen dioxide $NO_2$. Unburned fuel is supplied to the exhaust gas stream upstream said first aftertreatment component. As explained above, due to the chemistry prevailing in such aftertreatment components, the unburned hydrocarbons will be oxidized at the expense of the oxidation of nitric oxides, so that the relation between the proportion in nitrogen dioxide in relation to nitric oxide upstream and downstream said first aftertreatment component will remain essentially the same, since the supply of unburned fuel may have as a result that no further oxidation of nitric oxides into nitrogen oxides will occur in the first aftertreatment component.

The relation between nitric oxide and nitrogen dioxide in an exhaust gas stream leaving an internal combustion engine is such that the relative proportion of nitrogen dioxide is in the order of 10+−5 percent of the total content of nitrogen oxides. The addition of unburned fuel reduces or eliminates further oxidation of nitric oxides into nitrogen dioxide. In this way, the relative proportion of nitrogen dioxides in relation to nitric oxides when entering the reduction catalytic converter will still be relatively low.

As is well known, the fastest of the main three chemical reactions in a reduction catalytic converter is a reaction where nitric oxides and nitrogen dioxide are reduced at the same rate, so that, at least when additive is supplied in order to obtain a degree of conversion exceeding twice the content of nitrogen dioxide, that the nitrogen oxides leaving the reduction catalytic converter will essentially consist of nitric oxides only. This, in turn, has the result that differences in sensor sensitivity regarding nitric oxide and nitrogen dioxide can be disregarded, since it can be assumed that the exhaust gases leaving the reduction catalytic converter will consist solely of nitric oxides, for which sensor sensitivity in general is high.

Furthermore, according to the invention, correction of the supply of additive to the exhaust gas stream is performed when supplying unburned fuel to said exhaust gas stream, and hence when it can be assumed that the correction is based on a measurement where nitrogen oxides consist of nitric oxides only. According to the invention, therefore, accurate correction can be performed in a system where otherwise the actual relative proportions between nitric oxide and nitrogen dioxide may give rise to problems according to the above. The correction can be carried out in any suitable manner, such as by determining a remaining occurrence of nitrogen oxides downstream the reduction catalytic converter with an expected occurrence, and determine suitable correction of the injected amount on the basis of this difference. The correction may include applying a correction to a predetermined proportion, that is, for a particular occurrence of nitrogen oxides some predetermined amount of additive is supplied, where this predetermined amount is subject to the correction.

According to embodiments of the invention, unburned fuel is supplied to an extent such that expected oxidation of nitric oxide NO into nitrogen dioxide $NO_2$ in the first aftertreatment component is reduced to a considerably lower oxidation than would be the case if no unburned hydrocarbons were supplied in a properly operating system. For example, unburned fuel (unburned hydrocarbons) can be supplied to an extent that renders an expected average oxidation of nitric oxides into nitrogen dioxide over time when supplying hydrocarbons to less than 10 percent of the nitric oxides present in the exhaust gas stream, and according to embodiments of the invention, unburned hydrocarbons may be supplied to an extent that renders an expected oxidation of nitric oxides to be reduced essentially to zero.

According to embodiments of the invention, a first sensor is used to measure an occurrence of nitrogen oxides in the exhaust gas stream. This measure can then be used to correct e.g. an estimated occurrence of nitrogen oxides in the exhaust gas stream, such as by using a model representation of the occurrence of nitrogen oxides.

In this way, when correcting said supply of additive utilizing an estimation of the occurrence of nitrogen oxides in said exhaust gas stream, the estimated occurrence can be compensated using a determined difference between said measure and said estimated occurrence.

Such compensation can be used in various ways depending on the location of said sensor. For example, the first sensor for measuring nitrogen oxides $NO_x$ can be arranged upstream the first aftertreatment component. Such sensors, when supplying hydrocarbons, oftentimes are "poisoned" by the supply of hydrocarbons so that sensor signals when supplying hydrocarbons cannot be relied upon.

According to embodiments of the invention, prior to supplying unburned fuel to said exhaust gas stream, an occurrence of nitrogen oxides in said exhaust gas stream is measured using said first sensor, which is then used to correct e.g. a model representation of the occurrence of nitrogen oxides upstream said first aftertreatment component so that a more accurate model can be used during correction while unburned hydrocarbons are being supplied.

Further, it is also contemplated that said first sensor for measuring nitrogen oxides $NO_x$ is arranged downstream said second aftertreatment component.

In such cases, unburned fuel can be arranged to be supplied to said exhaust gas stream to control oxidation of nitric oxides as above and in addition the supply of additive to the exhaust gas stream is turned off and additive stored in the reduction catalytic converter can be allowed to be at least essentially, or fully/totally, consumed. In this way, the occurrence of nitrogen oxides downstream the reduction catalytic converter will be essentially the same as the occurrence upstream the first aftertreatment component so that an occurrence of nitrogen oxides in the exhaust gas stream downstream said reduction catalytic converter can be determined and used as measure of the occurrence of nitrogen oxides leaving the internal combustion engine.

Following measurement of the occurrence of nitrogen oxides in the exhaust gas stream downstream the reduction catalytic converter, and prior to said correction supply of additive, supply of additive to said exhaust gas stream can be arranged to be resumed so that e.g. the reduction catalytic converter can be "filled" with reductant in order to operate properly in a following correction.

According to embodiments of the invention, the difference between the measured occurrence of nitrogen oxides in said exhaust gas stream and the estimated occurrence of nitrogen oxides in the exhaust gas stream can be arranged to be determined for at least one operating point of said internal combustion engine. Correction of the supply of additive can then be arranged to be performed when said internal combustion engine operates at least essentially according to an operating point for which said difference is determined. The determination of a difference between an estimated occurrence of nitrogen oxides and a measured occurrence of nitrogen oxides can be arranged to be determined for a plurality of operating points, where correction can be performed for various operating points or, alternatively, for any such operating point. The determination for a plurality of operating points can also be used to interpolate the difference for operating points for which no explicit determination have been made.

The correction of the supply of additive according to the invention may also be arranged to take the exhaust gas mass flow, or in particular the mass flow of nitrogen oxides $NO_x$, into account. Different mass flows of nitrogen oxide $NO_x$ may have an impact on the correction of the supply of additive. With regard to $NO_x$ sensors, these measure the relative occurrence of nitrogen oxides $NO_x$ in the exhaust gas stream, e.g. expressed as a percentage, or fraction of the total mass flow of exhaust gases.

Consequently, the same relative occurrence of nitrogen oxides may be indicated for various different mass flows, but where the actual mass flows of nitrogen oxides $NO_x$ may vary considerably. Different mass flows, in turn, in particular with regard to nitrogen oxides $NO_x$, may give rise to substantial differences in supplied amount of additive. For example, if the exhaust gas flow is increased to the double while still having the same relative nitrogen oxide content this will result in essentially a double amount of additive being supplied. This considerably higher supply of additive may require a different correction than the lower supply of additive. Hence, according to embodiments of the invention, correction may be performed for various mass flows of nitrogen oxides $NO_x$.

Furthermore, different mass flows may also result in different efficiencies of the aftertreatment components. For example, different mass flows result in different space velocities in the aftertreatment components. If the mass flow is low, the space velocity is more favourable and there is more time for the reactions to occur, which may be beneficial from an efficiency point of view. If the mass flow is higher, a larger amount of reactions must take place at the same amount of time, and if the mass flow exceeds the maximum capacity of the aftertreatment component, e.g. reduction of nitrogen oxides may not occur to a full extent. Similarly, oxidation of nitric oxide NO into nitrogen dioxide $NO_2$ may be reduced with increasing mass flows, thereby affecting following reduction in a reduction catalytic converter.

For this reason, the mass flow may, according to embodiments of the invention, be taken into account as a parameter when performing correction, e.g. by applying a mass flow dependent correction factor, and correction may also be arranged to be performed for different mass flows of nitrogen oxides $NO_x$ to take into account variations in system operation due to varying mass flows.

In addition, efficiency of e.g. catalytic converters may deteriorate with increasing age, where such deteriorations may be most, or only, noticeable at higher mass flows where catalytic converter utilization is higher.

Different mass flows in general also require different amounts of hydrocarbons being supplied to the exhaust gas stream according to the invention, where such variations in the supply of hydrocarbons also may have an effect on the correction, hence providing further incitement to perform corrections at varying operating conditions.

Furthermore, a correction according to the invention, i.e. when supplying unburned hydrocarbons, can be arranged to be performed only in certain situations, such as when a previously determined correction of said supply of additive deviates from the predetermined proportion to a predetermined extent, since such deviations may be due to an incorrect assumption of the relative proportions of nitric oxides and nitrogen dioxides respectively.

According to embodiments of the invention, correction according to the invention is performed when a previously determined correction of said supply of additive deviates from said predetermined proportion such that the amount of additive being supplied in relation to an occurrence of nitrogen oxides in said exhaust gas stream exceeds an amount according to said predetermined proportion by a first amount.

Furthermore, the present invention is particularly suited for use e.g. in tests performed when the vehicle is taken in for service. In such situations, the method according to the invention can be performed when the vehicle is standing still under controlled conditions.

In particular, the internal combustion engine can be set to operate according to a predetermined operating point, which e.g. can be an operating point where the internal combustion engine is set to a speed of rotation exceeding the speed of rotation when idling, and where the load can be a load exceeding internal losses, e.g. by throttling the exhaust gas flow leaving the internal combustion engine, and/or applying a load e.g. by means of an electrical machine connected to an output shaft of the internal combustion engine. The operating point can, for example, be selected to ensure that the exhaust gas temperature reaches at least a first temperature t1, e.g. to ensure proper operation of the aftertreatment components.

When set to operate according to the predetermined operating point, an occurrence of nitrogen oxides in the exhaust gas stream is measured using a first sensor, which e.g. can be a sensor arranged upstream the first aftertreatment component as explained above. The supply of additive can then be corrected utilizing this measured occurrence of nitrogen oxides in the exhaust gas stream, thereby eliminating the possible problem of poisoned sensor, since the emissions of nitrogen oxides can be assumed to be essentially constant for as long as the internal combustion engine is operating according to the set operating point, in particular when surrounding conditions remain the same, e.g. with regard to ambient temperature, humidity etc.

As discussed above, the first sensor may also be arranged downstream the reduction catalytic converter, and with regard to tests performed when the vehicle is standing still, the method may then further include turning off supply of additive to said exhaust gas stream, and determine said measured occurrence of nitrogen oxides in said exhaust gas stream using said first sensor while supplying unburned fuel to said exhaust gas stream and when stored additive in said reduction catalytic converter has been consumed. Following the measure of nitrogen oxides, supply of additive is resumed, and reagent may be allowed to accumulate in the reduction catalytic converter to ensure normal operating conditions prior to correcting the supply of additive.

The invention may be carried out in a vehicle, and the invention also relates to a system corresponding to the method set forth above. The system is characterised in means carrying out features of the invention. Such means for carrying out features of the invention can consist of any suitable means, and the means can be specifically adapted to perform the features set forth in the system claims. Such means can consist of one or more control units, or other electrical, mechanical and/or electromechanical elements or arrangements.

Further characteristics of the present invention and advantages thereof are indicated in the detailed description of exemplary embodiments set out below and the attached drawings.

BRIEF DESCRIPTION OF THE DRAWINGS

FIG. 2 illustrates an exemplary method according to embodiments of the invention;

DETAILED DESCRIPTION OF THE INVENTION

In the following detailed description the present invention will be exemplified for a vehicle. The invention is, however, applicable also in other kinds of transportation means, such as air and water crafts. The invention is also applicable in fixed installations.

Figure 1A:
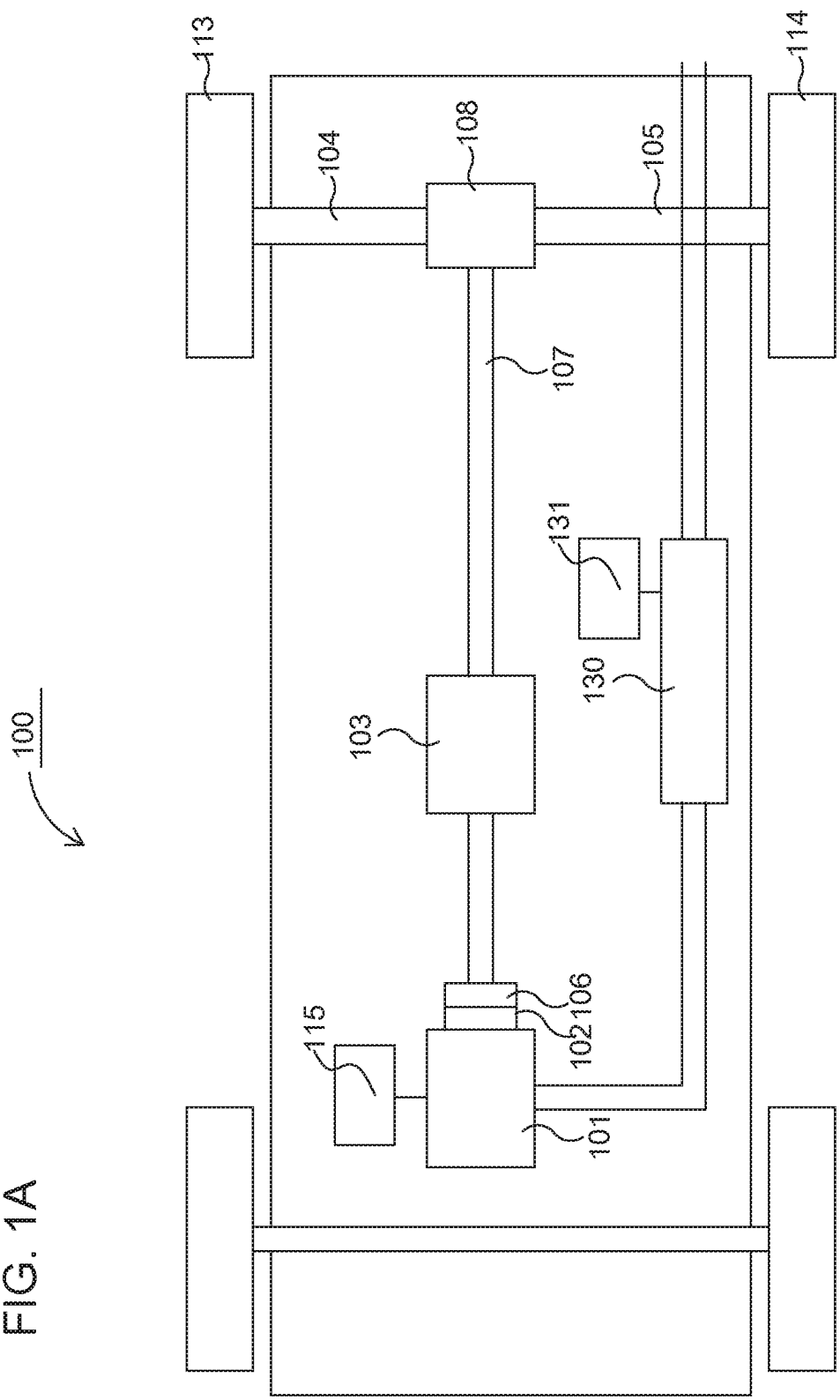
FIG. 1A illustrates a power train of an exemplary vehicle in which the present invention advantageously can be utilized.

FIG. 1A schematically depicts a power train of an exemplary vehicle 100. The power train comprises a power source, in the present example an internal combustion engine 101, which, in a conventional manner, is connected via an output shaft of the internal combustion engine 101, normally via a flywheel 102, to a gearbox 103 via a clutch 106. An output shaft 107 from the gearbox 103 propels drive wheels 113, 114 via a final gear 108, such as a common differential, and half shafts 104, 105 connected to said final gear 108. The internal combustion engine 101 is controlled by the vehicle control system via a control unit 115.

FIG. 1A, consequently, discloses a powertrain of a specific kind, but the invention is applicable in any kind of power train and also e.g. in hybrid vehicles. The disclosed vehicle further comprises an exhaust treatment system 130 for aftertreatment (purifying) of exhaust gases that results from combustion in the internal combustion engine 101. The functions of the exhaust treatment system 130 are controlled by means of a control unit 131.

The aftertreatment system 130 can be of various kinds and designs, and according to the disclosed embodiment an additive is supplied to the exhaust gas stream. An example of an exhaust treatment system 130 in which the present invention can be utilized is shown more in detail in FIG. 3, which schematically shows the exhaust treatment system 130 connected via an exhaust pipe 302 to the internal combustion engine 101. Exhausts generated by combustion in the internal combustion engine 101, indicated as an exhaust stream by arrows 303 are led to components of the exhaust treatment system 130.

The exhaust treatment system 130 according to the present example comprises an oxidation catalyst 310, which is arranged to oxidize one or several of nitrogen oxides NO and incompletely oxidized carbon compounds in the exhaust stream 303.

The exhaust system 130 further comprises a particulate filter 320 downstream of the oxidation catalytic converter 310, which, in a manner known per se, is arranged to catch and oxidize soot particles. The exhaust gas stream 303 passes through the filter structure of the particulate filter, where soot particles are caught in the filter structure from the passing exhaust stream 303, and are stored and oxidized in the particulate filter.

The oxidation catalytic converter 310 is at least partly coated with a catalytically oxidizing coating, wherein such oxidizing coating may comprise at least one precious metal, for example platinum. The use of the oxidation catalytic converter 310 in this manner results in an oxidation of nitric oxide NO into nitrogen dioxide $NO_2$, which is beneficial, for example, in regard of the efficiency in soot oxidation in the particulate filter DPF. However, the oxidation of nitric oxide NO into nitrogen dioxide $NO_2$ is also advantageous with regard to reduction of nitrogen oxides $NO_x$ through use of additive in a reduction catalytic converter 332, in this case a selective catalyst reduction (SCR) catalytic converter arranged downstream the particulate filter 320. Additionally, the oxidation catalyst may create heat through oxidation of unburned hydrocarbons HC in the exhaust stream. The reactions in the oxidation catalytic converter in general are such that oxidation of unburned hydrocarbons in the exhaust gas stream takes precedence over oxidation of nitric oxide NO into nitrogen dioxide $NO_2$. If the amount of unburned hydrocarbons is such that essentially all the capacity of the oxidation catalytic converter is consumed in oxidation of hydrocarbons, the available capacity for oxidation of nitric oxide NO into nitrogen dioxide $NO_2$ is reduced, and such oxidation may be reduced even to zero. The available capacity for oxidation of nitric oxide NO into nitrogen dioxide $NO_2$ can thereby be controlled by controlling addition of unburned hydrocarbons to the exhaust gas stream. According to the present example, the exhaust treatment system 130 comprises at least one external injector 350, which supplies unburned hydrocarbons HC from a tank 351 to the exhaust gas stream upstream the oxidation catalytic converter 310 under the control of control unit 131.

The addition of unburned hydrocarbons may also be performed e.g. through the use of late post injections in the combustion chambers of the internal combustion engine, at least part of the post injected hydrocarbons thereby being injected too late to participate in the combustion, thereby following the exhaust gas stream exiting the combustion chambers in an unburned state.

Downstream the particulate filter 320, the exhaust treatment system 13 is equipped with a dosage device, e.g. nozzle, 372 forming part of an additive dosing system, which is arranged to supply additive to the exhaust stream 303 for use in the SCR catalytic converter 332. This additive can, as according to the disclosed embodiment, for example, be an additive comprising urea as reagent and e.g. consist of AdBlue which constitutes a frequently used additive and which consists of a mixture of approximately 32.5% urea dissolved in water. Urea forms ammonium when heated, and the ammonium then reacts with nitrogen oxides $NO_x$ in the exhaust gas stream. The present invention is applicable when using AdBlue, as well as when using any other urea based additive, or additive suitable for use in the reduction of nitrogen oxides.

The additive dosing system further comprises an additive tank 376, which is connected to an injection nozzle 372 via a pump 373. The dosing of additive is controlled by an additive control unit 374, which generates control signals for controlling the supply of additive by controlling nozzle 372 and pump 373 so that a desired amount is injected into the exhaust gas stream 303 from the tank 376 using the injection nozzle 372.

The exhaust treatment system 130 may also be equipped with one or several sensors, such as one or more $NO_x$ sensors 362, 364 and/or one or several temperature sensors (not shown) which are arranged for the determination of $NO_x$ concentrations and temperatures in the exhaust treatment system 130, respectively. $NO_x$ sensor 362 is arranged upstream the oxidation catalytic converter but downstream the supply of hydrocarbons by injector 350. The $NO_x$ sensor 364 is arranged downstream the SCR catalytic converter 332, and provides a measure of the occurrence of nitrogen oxides leaving the vehicle following passage through the exhaust treatment system 130. The $NO_x$ sensor 364 may also be used for feedback regarding dosage of additive as explained above, and also when performing correction (adaption) of the supply of additive. According to embodiments of the invention, the $NO_x$ sensor 362 is not utilized, but instead a model representation of the occurrence of nitrogen oxides leaving the internal combustion engine is used.

Dosing systems for the supply of additive are in general well described in the prior art, and the precise manner in which the supply of additive is dosed/performed is therefore not described in detail herein. In general, the dosing varies, in principle, continuously as the operating conditions changes and the generation of nitrogen oxide therewith.

However, as was explained above, the amount of additive actually needed may in reality differ from the predetermined amount being injected, or believed to be injected. There may be various reasons for this. For example, the amount of additive being supplied may be at an erroneously low or high level. Also, the quality/concentration of the additive may differ from the quality/concentration of the additive for which dozing amounts were determined so that e.g. insufficient amounts of reagent is injected. A modelled occurrence of nitrogen oxides upstream the supply of additive may also be incorrect. Hence, the supply may be subject to correction. Correction, however, oftentimes rely upon measurements of the occurrence of nitrogen oxides downstream the reduction catalytic converter, where, as mentioned, such measurements may be misinterpreted, for example, when oxidation of nitric oxides into nitrogen dioxide differs from an expected oxidation so that the relative proportions of nitric oxides and nitrogen dioxide, respectively, differs from an expected relation, which may have an impact on the interpretation of sensor signals from $NO_x$ sensor 362.

In general, with regard to reduction catalytic converters such as SCR catalytic converters, reduction of nitric oxides and nitrogen dioxide occurs according to three main reactions, where according to the fastest reaction nitric oxide and nitrogen dioxide are reduced at a same proportion and rate. When this reaction no longer can occur, e.g. because either the nitric oxide or the nitrogen dioxide has been consumed, further reactions take place, where firstly nitric oxides is reduced, and secondly nitrogen dioxide is reduced.

Hence, depending on the relative proportions of nitric oxides and nitrogen dioxide when entering the reduction catalytic converter, the resulting occurrence following the reduction catalytic converter may be any from a combination of nitric oxides or any of nitric oxide or nitrogen dioxide. Given the difference in sensor sensitivity, the determined occurrence may differ substantially from the actual occurrence, which, in turn, may have an impact on correction.

According to the invention, it is provided a method for reducing negative impacts of sensor sensitivity when correcting supply of additive. An exemplary method 200 according to the invention will be described in the following with reference to FIG. 2. According to this example, it is assumed a presence of a $NO_x$ sensor upstream the supply of additive, i.e. presence of $NO_x$ sensor 362. According to embodiments of the invention, exemplified by the method according to FIG. 4 below, there is no $NO_x$ sensor upstream the supply of additive, i.e. $NO_x$ sensor 362 is not present. Instead a model representation of the nitrogen oxides leaving the internal combustion engine is used.

The method according to the invention can be implemented at least partly e.g. in the control unit 374 for controlling of the additive dosing system. As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

Figure 3:
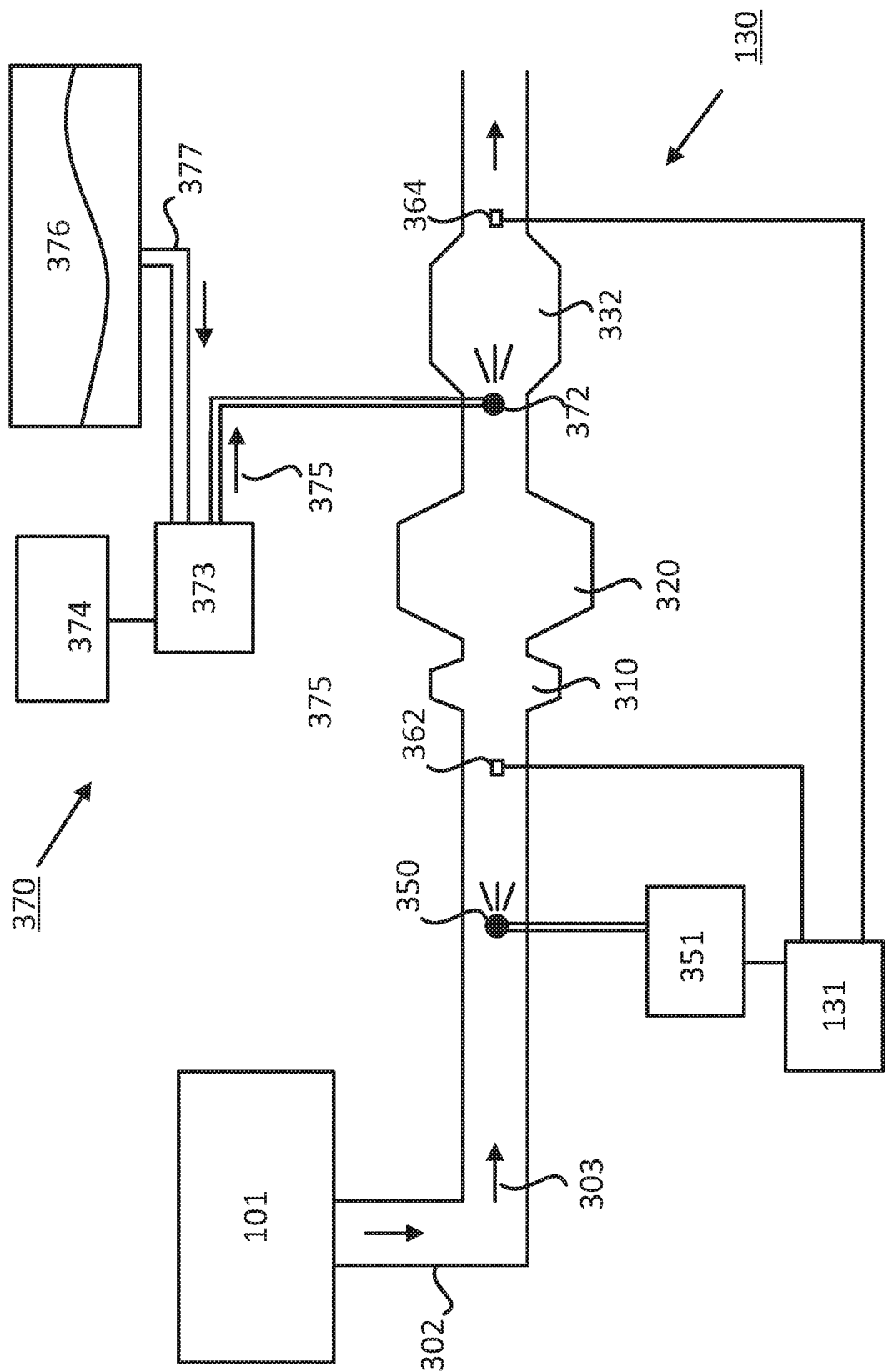
FIG. 3 illustrates an example of an aftertreatment system where a supply of additive is utilized and with which the present invention advantageously can be utilized.

For the sake of simplicity, FIGS. 1A, 3 depicts only control units 115, 130, 374, but vehicles 100 of the illustrated kind are often provided with significantly more control units, as one skilled in the art will appreciate. Control units 115, 130, 374 are arranged to communicate with one another and various components via said communication bus system and other wiring, partly indicated by interconnecting lines in FIG. 1A.

The present invention can be implemented in any suitable control unit in the vehicle 100, and hence not necessarily in the control unit 374. The correction of the supply of additive according to the present invention will usually depend on signals being received from other control units and/or vehicle components, and it is generally the case that control units of the disclosed type are normally adapted to receive sensor signals from various parts of the vehicle 100. The control unit 374 will, for example, receive signals e.g. from one or more of NOX sensors 362, 364, e.g. via control unit 131. Control units of the illustrated type are also usually adapted to deliver control signals to various parts and components of the vehicle, e.g. to the engine control unit or control unit 131.

Control of this kind is often accomplished by programmed instructions. The programmed instructions typically consist of a computer program which, when executed in a computer or control unit, causes the computer/control unit to exercise the desired control, such as method steps according to the present invention. The computer program usually constitutes a part of a computer program product, wherein said computer program product comprises a suitable storage medium 121 (see FIG. 1B) with the computer program 126 stored on said storage medium 121. The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc., and be arranged in or in connection with the control unit, whereupon the computer program is executed by the control unit. The behaviour of the vehicle in a specific situation can thus be adapted by modifying the instructions of the computer program.

Figure 1B:
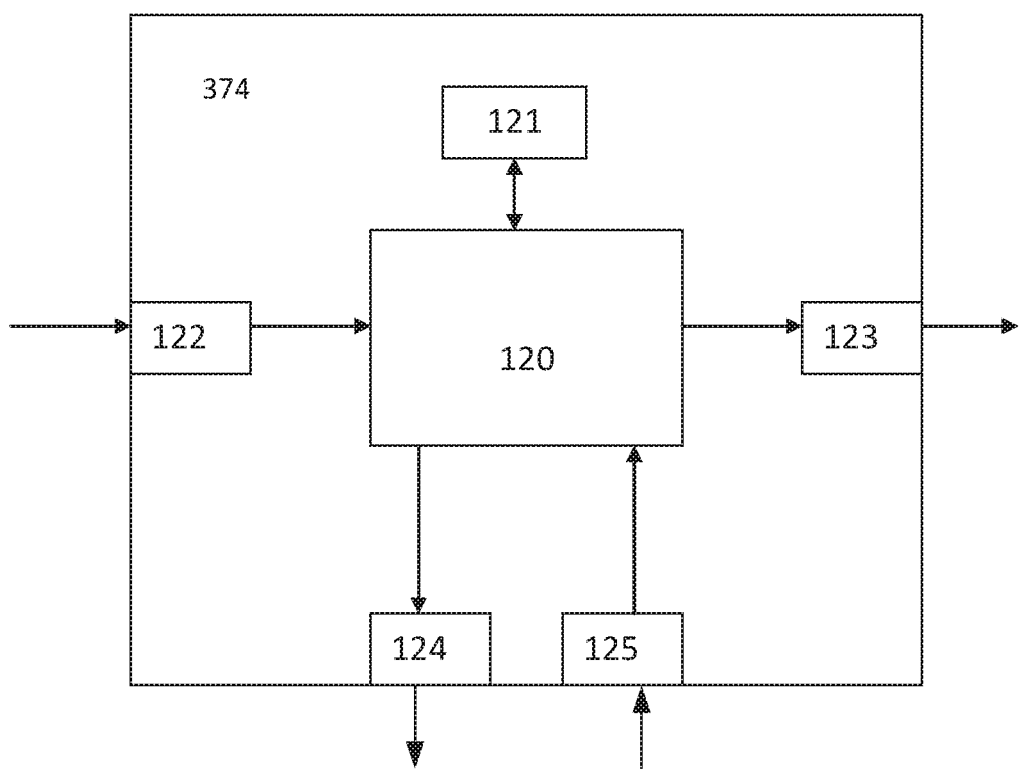
FIG. 1B illustrates an example of a control unit in a vehicle control system.

An exemplary control unit (the control unit 374) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 374 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component(s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

Returning to the exemplary method 200 illustrated in FIG. 2, the method starts in step 201, where it is determined whether correction of the supply of additive is to be performed according to the present invention. The method remains in step 201 for as long as this is not the case. The method continues to step 202 when it is determined that a correction of the supply of additive is to be carried out according to the invention. The transition from step 201 to step 202 can, for example, be initiated according to various criteria. For example, as was mentioned above, the determination can be arranged to be performed when one or more previous corrections results in a supply of additive that deviates from an expected supply to some extent. According to embodiments of the invention, correction is always performed according to the invention, and according to embodiments of the invention correction according to the invention is performed at regular intervals, e.g. to evaluate corrections performed according to other methods.

As was mentioned above, the present example relates to a system where a $NO_x$ sensor 362 is arranged upstream the aftertreatment components. Such sensors oftentimes get poisoned, i.e. become incapable of providing correct measurements of the occurrence of nitrogen oxides in the exhaust gas stream when subjected to unburned hydrocarbons.

In step 202, therefore, a measure of the present occurrence of nitrogen oxides $NO_x$ using the $NO_x$ sensor 362 is determined. Preferably, the current operating point/conditions for which the measure is taken are also determined. Such operating conditions may relate e.g. to current speed of rotation and load of the internal combustion engine.

In step 203 the measure is used to correct an estimated occurrence of nitrogen oxides leaving the internal combustion engine, where the estimated occurrence of nitrogen oxides can be determined e.g. through the use of a model representation of the occurrence of nitrogen oxides. In this way, errors in the estimated occurrence of nitrogen oxides are compensated through the use of an actual measurement. The determined compensation can be arranged to be used for various operating conditions of the internal combustion engine by applying suitable compensation factor determined from the measured occurrence on nitrogen oxides. The measurement and correction of step 202, 203 can also be arranged to be carried out for a number of different operating points of the internal combustion engine. It is also contemplated that correction factors are interpolated for operating points for which no explicit measurements have been carried out so that correction may be performed also for operating conditions for which no explicit measurement have been made. According to embodiments of the invention, the occurrence of nitrogen oxides $NO_x$ may be measured using $NO_x$ sensor 362 during normal operation for various operating points, where these measurements can be stored in the vehicle control system for the various operating points. Such measurements can then later be recalled for use as representation of the occurrence of nitrogen oxides $NO_x$ when the $NO_x$ sensor 362 is poisoned by supply of hydrocarbon during correction performed at such operating points.

As was explained above, the correction of the supply of additive according to the invention may also be arranged to take the mass flow of nitrogen oxides $NO_x$ into account since different mass flows of nitrogen oxides $NO_x$ may have an impact on efficiency of the aftertreatment components and require different correction for different mass flows.

According to embodiments of the invention, correction is performed for different mass flows of nitrogen oxides $NO_x$ to take this into account. According to embodiments of the invention, a mass flow dependent correction factor can be applied, where this factor can be arranged to be determined e.g. by empirical measurements or a model representation.

In step 204 it is determined whether the internal combustion engine is operating according to an operating point at which it is suitable to carry out correction. This can, for example, be a determination of whether the internal combustion engine 101 operates according to an operating point for which measurement and correction according to the above have been performed, or for which it is considered that the performed measurement can be used for correction. According to embodiments of the invention, a criterion is that the internal combustion engine is operating at relatively constant conditions with regard to speed of rotation and load.

The method may remain in step 204 for as long as this is not the case, and when the conditions for correction are fulfilled the method continues to step 205, where supply of unburned hydrocarbons such as fuel is commenced through the use of injector 350 and/or late post injections in one or more combustion chambers of the internal combustion engine 101. As was mentioned above, due to the chemistry prevailing in oxidation catalytic converter 310, oxidation of the supplied hydrocarbons will take precedence at the expense of oxidation of nitric oxides. Hydrocarbons can be supplied in a manner where the amount is determined e.g. on the basis of the current mass flow of the exhaust gas stream and/or the size of the oxidation catalytic converter. The higher the oxidation capacity of the oxidation catalytic converter, the higher the amount of injected hydrocarbons may be in order to reduce oxidation of nitric oxides to a desired extent. For example, hydrocarbons can be provided by an amount according to which oxidation of nitric oxides is expected to be reduced essentially to zero or at least to some predetermined extent. Since the relation between nitric oxides and nitrogen dioxide in the exhaust gas stream leaving the internal combustion engine is such that the relative proportion of nitrogen dioxide usually is at most 15% (10%±5%) of the total content of nitrogen oxides, the addition of hydrocarbons may be used to ensure that the relative proportion of nitrogen dioxide downstream the oxidation catalytic converter is maintained at a relatively low proportion and in particular a proportion well below 50% of the total occurrence of nitrogen oxides in exhaust gas stream leaving the oxidation catalytic converter.

Correction is then performed in step 206. The correction can be arranged to be performed in any suitable manner, e.g. by estimating the conversion rate, i.e. reduction rate. The conversion rate can, for example be estimated by comparing a presence of $NO_x$ upstream the supply of additive, which hence is determined according to the model representation while supplying hydrocarbons, with the presence of $NO_x$ downstream the reduction catalytic converter 332, which is determined by $NO_x$ sensor 364. In this way, it can be determined whether a desired conversion, i.e. reduction, is taking place and thereby whether the supply of additive can be assumed to be carried out in a desired manner, or whether there is an unbalance that needs to be corrected e.g. by increasing or decreasing the supply of additive. Due to the supply of unburned hydrocarbons it can be ensured that the relative proportions of nitric oxide and nitrogen dioxide downstream the reduction catalytic converter are such that only nitric oxides NO remain. This, in turn, means that the occurrence of nitrogen oxides downstream the reduction catalytic converter can be determined with high sensitivity, since the accuracy in the measurements of nitric oxides in general is substantially equal to 1, and in particular differences in sensitivity no longer will have an impact on the measurement result.

Again, the reason for this is that the fastest of the main three chemical reactions in a reduction catalytic converter is a reaction where nitric oxides and nitrogen dioxide are reduced at the same rate, so that, at least when additive is supplied in order to obtain a degree of conversion exceeding twice the content of nitrogen dioxide, which is low due to the supply of hydrocarbons, the nitrogen oxides leaving the reduction catalytic converter can be controlled to consist of nitric oxides only to allow sensor accuracy to be determined with a high degree of certainty. Consequently, according to the invention, correction is performed while supplying unburned fuel to the exhaust gas stream so that it can be assumed that correction is based on a measurement of nitric oxides only downstream the SCR catalytic converter.

According to the invention, a correction can be obtained that eliminates misinterpretations of sensor signals e.g. when the nitrogen oxides downstream the SCR catalytic converter contains a larger proportion of nitrogen dioxide than expected. The method is then ended in step 207.

Furthermore, as was mentioned above, according to embodiments of the invention, there is no $NO_x$ sensor arranged upstream the aftertreatment components. Instead, only a $NO_x$ sensor downstream the reduction catalytic converter is utilized. That is, NOX sensor 362 of FIG. 3 is not present, but only $NO_x$ sensor 364. An exemplary method according to the invention for a system of this kind is exemplified in FIG. 4.

Similar to the above, the method starts in step 401, e.g. with the same determination and criteria as exemplified above with reference to step 201 of FIG. 2. When correction is to be performed according to the invention, the method continues to step 402, where supply of additive using injection nozzle 372 is turned off. In step 403 it is determined whether additive stored in the reduction catalytic converter has been consumed. This can be determined e.g. through the use of stored results from empirical measurements, and/or a model representation of the SCR catalytic converter, current mass flow or any other suitable manner. The method remains in step 403 for as long as it is considered that stored additive/reagent remains in the SCR catalytic converter 332. When stored reagent is considered consumed, the method continues to step 404, where supply of unburned hydrocarbons is commenced.

In step 405, in this embodiment, while supplying unburned fuel to the exhaust gas stream, a measure of the occurrence of nitrogen oxides $NO_x$ using the $NO_x$ sensor 364 is determined. Hence, in this case, the measure is determined by means of the $NO_x$ sensor downstream the SCR catalytic converter 332, but since no additive is supplied and no or reduced oxidation of nitric oxides into nitrogen dioxide occurs in the oxidation catalytic converter 310 due to the supply of hydrocarbons, the occurrence of nitrogen oxides, and relative proportion between nitric oxide and nitrogen dioxide, will be essentially the same at the position of $NO_x$ sensor 364 as at a position upstream the aftertreatment components, such as at the position of $NO_x$ sensor 362 of FIG. 3. Similar to the above, the current operating conditions for which the measure is taken are preferably also determined.

In step 406 the measure is used to correct an estimated occurrence of nitrogen oxides leaving the internal combustion engine as above, and in step 407 supply of additive is resumed so that e.g. the reduction catalytic converter can be filled up with reductant in order to operate properly in a following correction. In step 408, similar to step 204 above, it is determined whether the internal combustion engine is operating according to an operating point at which it is suitable to carry out correction, and when the conditions for correction are fulfilled the method continues to step 409 where correction is performed as above. The method is then ended in step 410. It is also contemplated that the supply of hydrocarbons is turned off following step 405 pending an affirmative determination in step 408 after which supply of hydrocarbons can be resumed.

Hence, the invention is equally applicable irrespective of whether there is a $NO_x$ sensor arranged upstream the aftertreatment components or not.

Furthermore, the invention is advantageous to use when the vehicle is taken in for service, where correction can be performed in a highly controllable manner since the correction can be performed when the vehicle is standing still and in essentially constant ambient conditions.

Figure 4:
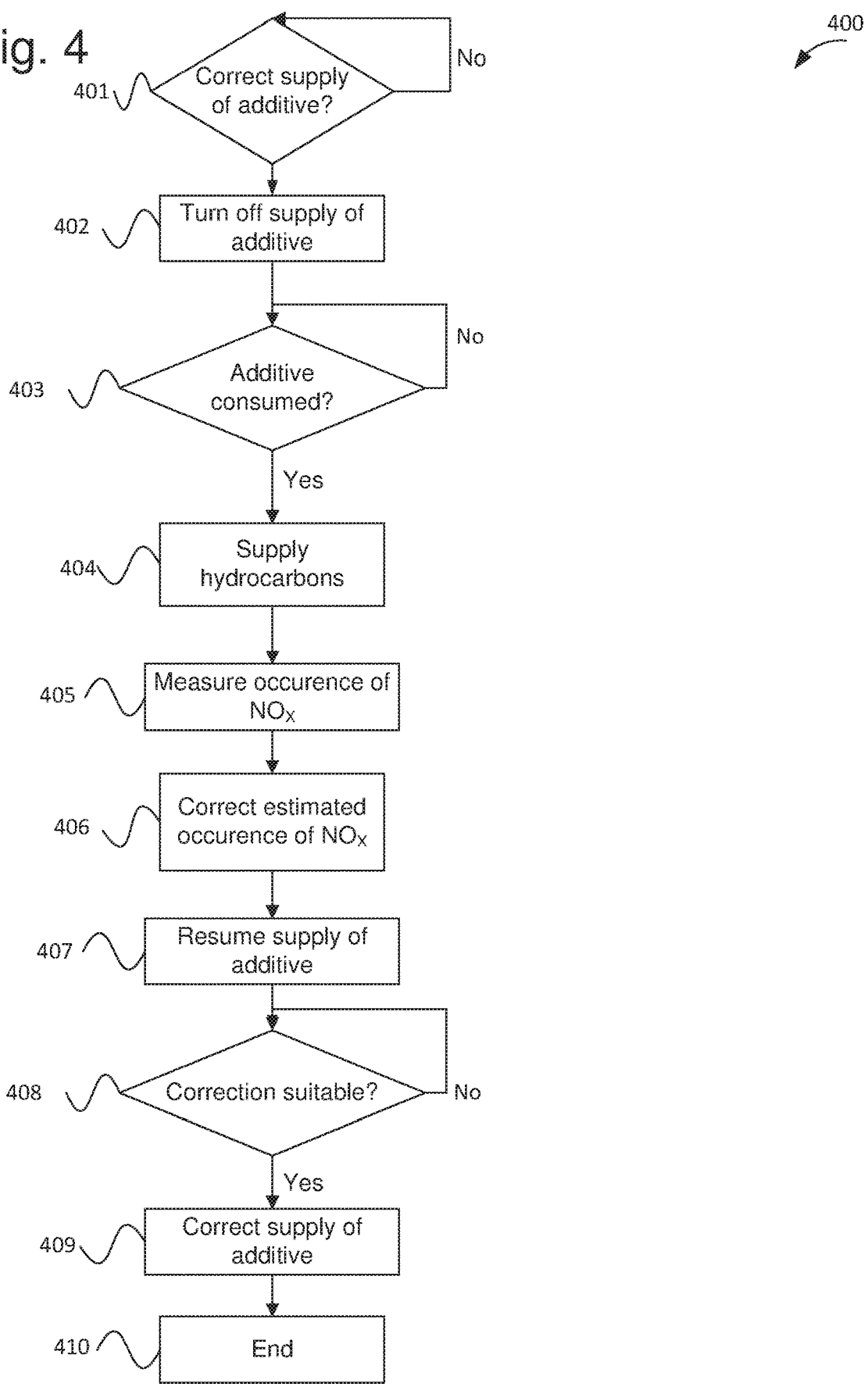
FIG. 4 illustrates a further exemplary method according to embodiments of the invention.

In such situations the methods of FIGS. 2 and 4 may include a further step, prior to performing the measurements, where the internal combustion engine is set to operate according to a predetermined operating point, which preferably is an operating point where the exhaust gas stream is throttled, e.g. using an exhaust brake or other throttling means, to increase load on the internal combustion engine, and wherein a speed of rotation of said internal combustion engine is set to exceed an idling speed of rotation. For example, the operating point can be set such that the exhaust gases reaches at least a minimum temperature to ensure proper heating of the aftertreatment components.

According to the embodiments discussed in connection to the drawings, the exhaust treatment system 130 shown in FIG. 3 comprises an oxidation catalytic converter 310, a particulate filter 320 downstream the oxidation catalytic converter 332 and an SCR catalytic converter 332 located downstream the particulate filter 320.

The exhaust treatment system may, however, be of various other designs comprising further/other components for as long as a reduction catalytic converter is arranged downstream an aftertreatment component being arranged to oxidize nitric oxide NO into nitrogen dioxide $NO_2$. The component being arranged to oxidize nitric oxide NO into nitrogen dioxide $NO_2$ is for simplicity only referred to as oxidation catalytic converter in the following.

For example, the exhaust treatment system may comprise further exhaust treatment components upstream the oxidation catalytic converter. For example, the exhaust treatment system may comprise a further selective reduction catalytic converter, where this further selective reduction catalytic converter may be arranged upstream the oxidation catalytic converter. Examples of such designs are disclosed, for example, in the International patent applications PCT/SE2015/050220 and PCT/SE2015/050223. With regard to such system designs, operation according to the invention may still be carried out in the same manner. However, since the present invention relies on a supply of unburned fuel to an oxidation catalytic converter in order to reduce an oxidation of nitric oxide NO into nitrogen dioxide $NO_2$, additional actions may have to be taken.

For example, if the supply of unburned fuel is arranged to occur upstream e.g. an additional selective catalytic reduction catalytic converter, which in turn is located upstream the oxidation catalytic converter, it may have to be ensured that the unburned fuel passes through this additional selective catalytic converter to thereby reach the oxidation catalytic converter and thereby ensure operation according to the invention.

This may be controlled, for example, by controlling the exhaust gas/aftertreatment component temperature in particular with regard to the upstream selective catalytic reduction converter. If, for example, the temperature of the upstream selective reduction catalytic converter is unfavourable with regard to passing through unburned fuel, the unburned fuel may, to a larger or lesser extent, be stored, e.g. by being adsorbed or absorbed, in the upstream selective catalytic converter, which in turn may prohibit, and/or reduce, the desired amount of unburned fuel from reaching the oxidation catalytic converter. This, in turn, may have the result that the oxidation of nitrogen oxide into nitrogen dioxide is not reduced to the desired extent.

However, by controlling the operating temperature of the exhaust gas stream and/or the upstream selective reduction catalytic converter, the temperature(s) may be controlled to be in a temperature region where the unburned fuel passes through the upstream selective catalytic reduction converter substantially without being stored and instead reach the oxidation catalytic converter to a desired extent.

With regard to controlling aftertreatment temperature, it is in general the case that the temperature of the one or more aftertreatment components being located upstream the oxidation catalytic converter should not be too low. This is because it is in general when the component temperature is low that e.g. unburned fuel may be undesirably stored in aftertreatment components. Alternatively, or in addition, the time it takes for the unburned fuel to pass through the one or more components may increase when the temperature is low, e.g. by the unburned fuel temporarily being caught and released by the aftertreatment component. An undesirably low aftertreatment component temperature may therefore impose a risk that the desired operation according to the invention may be negatively affected due to lack of unburned fuel reaching the oxidation catalytic converter. The temperature control that is required to obtain the desired operation lies well within the skills of the person skilled in the art.

Further, it is also contemplated that in cases where one or more aftertreatment components are located upstream the oxidation catalytic converter, the supply of unburned fuel may be arranged to be carried out downstream these further components. In this way problems of the above kind may be reduced or eliminated.

However, there also exist solutions where the oxidation catalytic converter is integrated with an upstream selective catalytic converter. Examples of systems of this kind can be found, for example, in the International patent applications PCT/SE2015/050220 and PCT/SE2015/050223. The oxidation catalytic converter is then oftentimes located at the downstream end of the combined component. Hence there will inherently be e.g. a selective reduction catalytic converter portion upstream the oxidation catalytic converter portion, where no supply of unburned fuel may be provided between the two component portions. Consequently, temperatures may have to be controlled also in such solutions to obtain the desired transportation of unburned fuel to the oxidation catalytic converter portion when carrying out the invention. The oxidation catalytic converter may also be designed to be integrated with other and/or further types of exhaust treatment components in a single component, in which case the above may also apply.

Finally, the present invention has been exemplified for a vehicle. The invention is, however, applicable in any kind of craft, such as, e.g., aircrafts and watercrafts. The invention is also applicable for use in combustion plants. Also, the aftertreatment system may comprise further components such as one or more particle filters, one or more oxidation catalytic converters as is known per se. It is also contemplated that the aftertreatment system may comprise more than one SCR catalytic converter. For example, a further SCR catalytic converter or other reduction catalytic converter can be arranged upstream the oxidation catalytic converter.

The invention claimed is:

1. A method for correcting a supply of additive to an exhaust gas stream resulting from combustion in an internal combustion engine, said exhaust gas stream being subject to aftertreatment through a first and a second aftertreatment component, said first aftertreatment component being arranged for oxidation of nitric oxide into nitrogen dioxide, said second aftertreatment component being a reduction catalytic converter arranged downstream said first aftertreatment component, wherein additive is supplied to said exhaust gas stream for reduction of nitrogen oxides in said reduction catalytic converter, said additive being supplied in proportion to an occurrence of nitrogen oxides in said exhaust gas stream, said proportion being subject to correction, said method comprising:
supplying unburned fuel to said exhaust gas stream upstream said first aftertreatment component to reduce oxidation of nitric oxide into nitrogen dioxide in said first aftertreatment component; and
correcting said supply of additive to said exhaust gas stream when supplying unburned fuel to said exhaust gas stream.

2. The method according to claim 1, further including:
supplying unburned fuel to said exhaust gas stream upstream said first aftertreatment component such that expected oxidation of nitric oxide into nitrogen dioxide in said first aftertreatment component is reduced such that, in average, less than 10 percent of the nitric oxide present in the exhaust gas stream are oxidized into nitrogen dioxide.

3. The method according to claim 1, further including:
supplying unburned fuel to said exhaust gas stream upstream said first aftertreatment component such that expected oxidation of nitric oxide into nitrogen dioxide in said first aftertreatment component is reduced to essentially zero.

4. The method according to claim 1, further including:
using a first sensor, measuring an occurrence of nitrogen oxides in said exhaust gas stream;
determining a difference between said measured occurrence of nitrogen oxides in said exhaust gas stream and an estimated occurrence of nitrogen oxides (NW in said exhaust gas stream; and
when correcting said supply of additive, compensating estimations of the occurrence of nitrogen oxides in said exhaust gas stream using said determined difference.

5. The method according to claim 4, wherein said first sensor for measuring nitrogen oxides is arranged upstream said first aftertreatment component and said method further including:
measuring said occurrence of nitrogen oxides in said exhaust gas stream prior to supplying unburned fuel to said exhaust gas stream.

6. The method according to claim 4, wherein said first sensor for measuring nitrogen oxides is arranged downstream said reduction catalytic converter, the method further including:
supplying unburned fuel to said exhaust gas stream to reduce oxidation of nitric oxides in said first aftertreatment component;
turning off said supply of additive to said exhaust gas stream, and measuring said occurrence of nitrogen oxides in said exhaust gas stream when said supply of additive is turned off and unburned fuel is being supplied to said exhaust gas stream.

7. The method according to claim 4, wherein said first sensor for measuring nitrogen oxides is arranged downstream said reduction catalytic converter the method further including:
supplying unburned fuel to said exhaust gas stream to control reduction of nitrogen oxides in said reduction catalytic converter such that essentially no reduction occurs in said reduction catalytic converter;
turning off said supply of additive to said exhaust gas stream; and
measuring said occurrence of nitrogen oxides in said exhaust gas stream when said supply of additive is turned off and unburned fuel is being supplied to said exhaust gas stream.

8. The method according to claim 7, further including:
following said measuring of said occurrence of nitrogen oxides in said exhaust gas stream and prior to said correction, resuming said supply of additive to said exhaust gas stream.

9. The method according to claim 4, further including:
determining said difference between said measured occurrence of nitrogen oxides in said exhaust gas stream and said estimated occurrence of nitrogen oxides in said exhaust gas stream for at least one operating point of said internal combustion engine; and
correcting said supply of additive when said internal combustion engine operates at least essentially according to an operating point for which said difference is determined.

10. The method according to claim 1, said correction including applying a correction to a predetermined supply of additive in proportion to an occurrence of nitrogen oxides, further including:
correcting said supply of additive when a previously determined corrected supply of additive in proportion to the occurrence of nitrogen oxides deviates from the predetermined proportion of additive in relation to the occurrence of nitrogen oxides to a predetermined extent.

11. The method according to claim 10, further including: determining that said previously determined correction of said supply of additive deviates from said predetermined proportion to said predetermined extent when the amount of additive being supplied in relation to an occurrence of nitrogen oxides in said exhaust gas stream exceeds the amount of additive to be supplied according to said predetermined proportion by a first amount of additive.

12. The method according to claim 1, further including, when a vehicle is standing still:
controlling said internal combustion engine to operate according to a predetermined operating point;
measuring and storing an occurrence of nitrogen oxides in said exhaust gas stream using a first sensor;
when correcting said supply of additive, utilizing said measured occurrence of nitrogen oxides in said exhaust gas stream.

13. The method according to claim 12, said first sensor being arranged downstream said reduction catalytic converter, further including:
turning off said supply of additive to said exhaust gas stream;
allowing additive stored in said reduction catalytic converter to be consumed;
when supplying unburned fuel to said exhaust gas stream and when stored additive in said reduction catalytic converter is at least essentially consumed, determining said measured occurrence of nitrogen oxides in said exhaust gas stream using said first sensor;
resuming said supply of additive to said exhaust gas stream; and
when correcting said supply of additive, utilising said stored occurrence of nitrogen oxides in said exhaust gas stream.

14. The method according to claim 13, further including: selecting said predetermined operating point such that an exhaust gas temperature reaches at least a first temperature.

15. The method according to claim 12, further including: said predetermined operating point being an operating point wherein said exhaust gas stream is throttled to increase load on said internal combustion engine and wherein a speed of rotation of said internal combustion engine exceeds an idling speed of rotation.

16. The method according to claim 1, further including: performing said correction for a plurality of operating points of said internal combustion engine, said plurality of operating points being selected such that correction is performed for different mass flows of the exhaust gas stream.

17. The method according to claim 1, wherein at least one additional aftertreatment component is arranged between said supply of unburned fuel and said first aftertreatment component, further including:
controlling an operating temperature of said at least one additional aftertreatment component such that said unburned fuel is supplied to said first aftertreatment component by being passed through said at least one additional aftertreatment component.

18. The method according to claim 1, further including: when correcting said supply of additive, applying a mass flow dependent correction factor.

19. The method according to claim 1, wherein said unburned fuel is hydrocarbon based.

20. The computer program product stored on a non-transitory computer-readable medium, said computer program product for correcting a supply of additive to an exhaust gas stream resulting from combustion in an internal combustion engine, said exhaust gas stream being subject to aftertreatment through a first and a second aftertreatment component, said first aftertreatment component being arranged for oxidation of nitric oxide into nitrogen dioxide, said second aftertreatment component being a reduction catalytic converter arranged downstream said first aftertreatment component, wherein additive is supplied to said exhaust gas stream for reduction of nitrogen oxides in said reduction catalytic converter, said additive being supplied in proportion to an occurrence of nitrogen oxides in said exhaust gas stream, said proportion being subject to correction, said computer program product comprising computer instructions to cause one or more electronic control units or computers to perform the following operations:
supplying unburned fuel to said exhaust gas stream upstream said first aftertreatment component to reduce oxidation of nitric oxide into nitrogen dioxide in said first aftertreatment component; and
correcting said supply of additive to said exhaust gas stream when supplying unburned fuel to said exhaust gas stream.

21. A system for correcting a supply of additive to an exhaust gas stream resulting from combustion in an internal combustion engine, said exhaust gas stream being subject to aftertreatment through a first and a second aftertreatment component, said first aftertreatment component being arranged for oxidation of nitric oxide into nitrogen dioxide, said second aftertreatment component being a reduction catalytic converter arranged downstream said first aftertreatment component, and wherein additive is supplied to said exhaust gas stream for reduction of nitrogen oxides in said reduction catalytic converter, additive being supplied in proportion to an occurrence of nitrogen oxides in said exhaust gas stream, said proportion being subject to correction, the system comprising:
means adapted to supply unburned fuel to said exhaust gas stream upstream said first aftertreatment component to reduce oxidation of nitric oxide into nitrogen dioxide in said first aftertreatment component; and
means adapted to correct said supply of additive to said exhaust gas stream when supplying unburned fuel to said exhaust gas stream.

22. The system according to claim 21, wherein said first aftertreatment component being an aftertreatment component designed such that oxidation of hydrocarbons take precedence over oxidation of nitric oxide into nitrogen dioxide.

23. The system according to claim 21, wherein: at least one additional aftertreatment component is arranged between said means adapted to supply unburned fuel to said exhaust gas stream, and said first aftertreatment component.

24. The system according to claim 21, wherein: said first aftertreatment component forms a portion of an aftertreatment component that, in addition, comprises an additional aftertreatment component portion.

25. The system according to claim 23, wherein means for controlling an operating temperature of said at least one additional aftertreatment component such that said unburned fuel is supplied to said first aftertreatment component by being passed through said at least one additional aftertreatment component.

26. A vehicle comprising a system for correcting a supply of additive to an exhaust gas stream resulting from combustion in an internal combustion engine, said exhaust gas stream being subject to aftertreatment through a first and a second aftertreatment component, said first aftertreatment component being arranged for oxidation of nitric oxide into nitrogen dioxide, said second aftertreatment component being a reduction catalytic converter arranged downstream said first aftertreatment component, and wherein additive is supplied to said exhaust gas stream for reduction of nitrogen oxides in said reduction catalytic converter, additive being supplied in proportion to an occurrence of nitrogen oxides in said exhaust gas stream, said proportion being subject to correction, the system comprising:

means adapted to supply unburned fuel to said exhaust gas stream upstream said first aftertreatment component to reduce oxidation of nitric oxide into nitrogen dioxide in said first aftertreatment component; and means adapted to correct said supply of additive to said exhaust gas stream when supplying unburned fuel to said exhaust gas stream.

* * * * *

UNITED STATES PATENT AND TRADEMARK OFFICE
CERTIFICATE OF CORRECTION

| | | |
|---|---|---|
| PATENT NO. | : 10,954,839 B2 | Page 1 of 1 |
| APPLICATION NO. | : 16/316302 | |
| DATED | : March 23, 2021 | |
| INVENTOR(S) | : Mikael Lundström et al. | |

It is certified that error appears in the above-identified patent and that said Letters Patent is hereby corrected as shown below:

In the Claims

In Column 18, Claim 4, please delete "(NW" in Line 9

Signed and Sealed this
Eighth Day of November, 2022

Katherine Kelly Vidal
*Director of the United States Patent and Trademark Office*